A. W. Streeter,
Bit Stock.
No. 737, Reissued June 14, 1859.
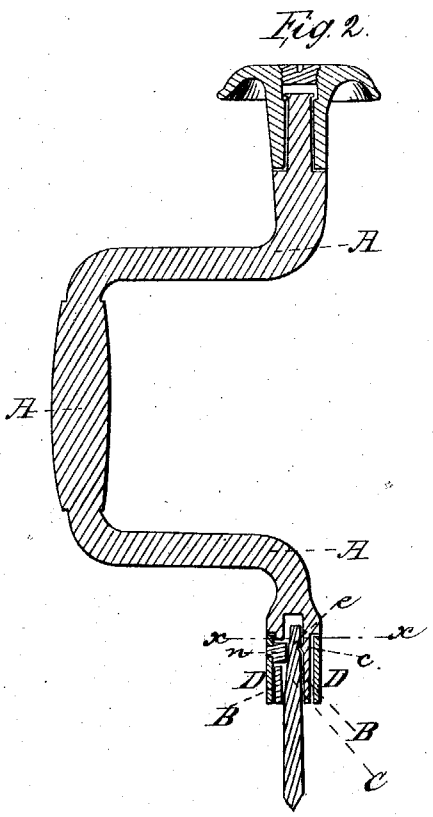
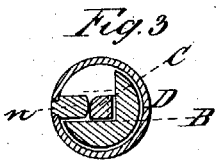
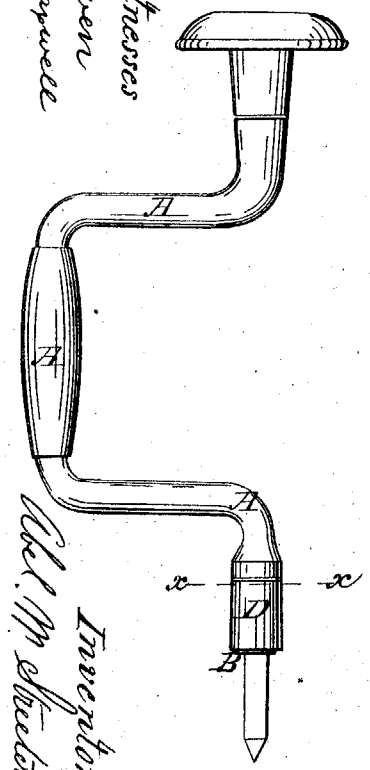
Witnesses
A Bowen
Arthur Maxwell
Inventor:
Abel M. Streeter.
AM. PHOTO-LITHO. CO. N.Y. (OSBORNE'S PROCESS)

UNITED STATES PATENT OFFICE.

ABEL W. STREETER, OF SHELBURNE FALLS, MASSACHUSETTS.

IMPROVEMENT IN FASTENING CENTER-BITS.

Specification forming part of Letters Patent No. 12,289, dated January 23, 1855; Reissue No. 737, dated June 14, 1859.

*To all whom it may concern:*

Be it known that I, ABEL W. STREETER, of Shelburne Falls, in the county of Franklin and State of Massachusetts, have invented a new and useful Improvement in the Manner of Fastening a Bit in its Stock; and I do hereby declare the following to be a full, clear, and exact description of the same, reference being had to the accompanying drawings, making a part of this specification, in which—

Figure 1 represents an elevation of the bit and stock complete. Fig. 2 represents a vertical central section through the same. Fig. 3 represents a cross-section taken through the lines *x x* of Figs. 1 and 2.

Similar letters of reference where they occur in the separate figures denote like parts in all the drawings.

My invention consists in securing the shank of a bit to the socket of a bit-stock by the combined use of a stationary catch with pressure that is removable, so that the bit shall be firmly held to or in the socket, but be easily removed therefrom by removing the pressure that holds it to the stationary catch.

I am aware that spring-catches have been used in holding bits to their stocks. These are not reliable, as they fail to firmly hold the bit in place. Movable fastenings for this purpose have also been used. They also are objectionable, as a slight displacement of them, which often happens in using the bit, releases the bit or detaches it from the shank.

My fastening is not dependent upon a spring, nor yet upon a moving device of any kind, solely. I use a stationary catch on or in either the bit or the socket, with a cam, lever, bearer, or pressure that holds the bit to the catch.

My stationary catch involves the use of a projection on one piece and a suitable recess or opening in or on the other piece, so that when these two are in place and pressure applied to hold them in place the fastening shall be firm.

The action or effect of my fastening is like that of a mortise and tenon, which may be deemed permanent or stationary, and a key or wedge to hold the tenon to the mortise, which key or wedge is removable, for the further purpose of separating the two pieces thus held together when for any purpose such separation becomes necessary. In my fastening, too, the strain comes upon the permanent or stationary catch, and not upon anything movable or that is held by a spring, and this distinguishes it from anything of the kind for a similar purpose of which I have knowledge.

I mention a cam, a lever, and a bearer as devices by which the pressure or friction is attained. It is immaterial how it is produced so long as there is sufficient to keep the projection on one in the recess or opening of the other.

To enable others skilled in the art to make and use my invention, I will proceed to describe how the same may be carried into successful practice.

A represents a bit-stock of any of the usual forms, and B the socket into which the shank C of the bit is inserted. The recess in the socket should be large enough not only to receive the shank of the bit, but to allow the stationary catch to properly take into the recess or opening prepared for it also.

In the drawings I have represented the stationary catch *c* as made on the socket, and the recess *e* in the shank C; but of course it is immaterial which of the two pieces (the shank or the socket) contains the catch or projection, and which the recess or opening into which it takes, so long as there is a projection and an opening for it to enter. When the shank of the bit and the socket are thus united by a projection on one fitting into a recess in the other, and pressure is applied to hold these two devices together, the catch is made perfect.

I apply the pressure as follows: D is a ring surrounding the socket, and having upon it a cam, lever, or bearer, *n*, that extends into the socket, and when turned or moved into proper position this piece *n* holds the shank and socket together. By reference to Fig. 2 it will be perceived that the end of the pressure-piece *n* is wedge-shaped, and that the ring is only a means of bringing this wedge into action, or causing it to hold the bit and socket together, or of removing the wedge or pressure when the bit is to be removed. The three devices thus form a very firm fastening—viz., the projection, the recess, and the wedge pressure—and so long as these are used as a fastening for bits I shall claim them as mine, as I am the first to so use them. The shanks of bits are usually tapering on one, two, or more of their sides, and thus assume the wedge form.

I deem it immaterial how or where these devices are placed on the bit and the socket, so long as the bit and socket are held together by a projection on one and a corresponding opening in the other, and pressure to hold them together. Nor does the size or shape of the projection, or the recess, or the pressure-piece change the character of the catch as a whole. I represent a mortise in the socket through which the wedge *n* projects to come in pressure-contact with the shank of the bit C, so as to hold the stationary catch and the recess for it together; but, as before stated, it is immaterial to which or on which of the two pieces the shank and socket that the mortise, wedge, or key, stationary catch, and recess are applied, so long as their offices are performed in making the fastening, or so long as a stationary catch and a recess are held together by pressure applied externally, or from a point accessible to the user, that he may readily fasten or unfasten the shank of the bit.

Having thus fully described the nature and object of my invention, what I claim therein as new, and desire to secure by Letters Patent, is—

Fastening a bit in its stock by means of a projection on one and a suitable recess for it on the other, when combined with mechanical pressure or friction that will hold the projection and recess together, substantially as described.

ABEL W. STREETER.

Witnesses:

ARTHUR MAXWELL,
A. BONEN.